July 30, 1957  R. K. ILER  2,801,185

SILICA HYDROSOL POWDER

Filed May 16, 1952

INVENTOR:
Ralph K. Iler
BY Albert B. Griggs &
Fred C. Carlson
ATTORNEYS

United States Patent Office 2,801,185
Patented July 30, 1957

2,801,185
SILICA HYDROSOL POWDER

Ralph K. Iler, Brandywine Hundred, Del., assignor to E. I. du Pont de Nemours and Company, Wilmington, Del., a corporation of Delaware Application May 16, 1952, Serial No. 288,233

6 Claims. (Cl. 106—288)

This invention relates to reversible, silica organosols which can be dried to novel powder products and then redispersed to form an organosol.

Figure 2:
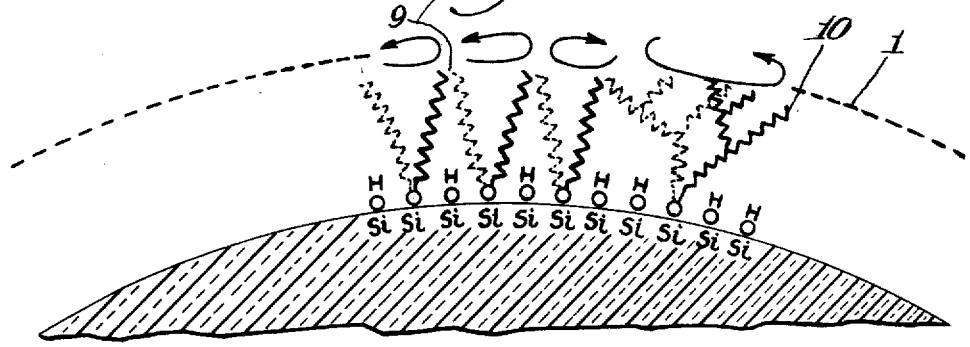
Figure 1:
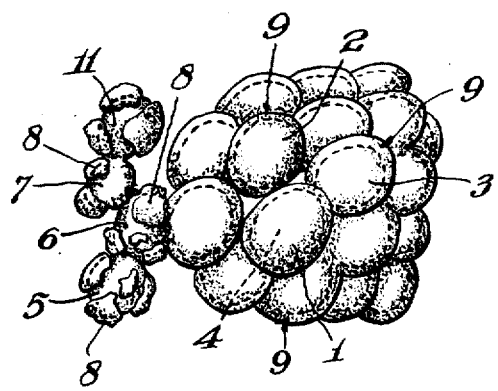

In the drawings, Figure 1 is an illustration in perspective of a powdered product of the invention, and Figure 2 is a greatly enlarged, cross-sectional detail showing in semi-diagrammatic fashion the structure of a novel product of the invention.

Considering the novel products and the processes of the invention broadly and referring to the drawings, there is shown in Figure 1 a pile of discrete particles such as those noted at 1, 2 and 3. The units 1, 2 and 3 each have a core 4 of dense silica. The cores 4, shown by dotted lines, are coated with a hydrophobic material 9. The cores are, therefore, separated from each other and kept out of contact by the coating 9.

The structure of a particle is better seen in the enlarge diagram of Figure 2. In Figure 2 the particle 1 is shown, the surface being illustrated by a dotted line. The core of silica 4 is shown in cross-section. The coating is illustrated as composed of organic groups 9, which, for example, may be primary alcohol groups. Each primary alcohol is illustrated as rotating about its point of attachment on the surface of the particle, through an oxygen linkage to a surface silicon atom. The effective area of coverage of the group 9 is accordingly represented by the circumference of the base of the cone, that is to say, the part which is shown with a circular arrow along the dotted line 1. As will be noted hereinafter, it is quite important that the surface be sufficiently covered so that the organic groups effectively prevent contact of the silica surface with other silica surfaces. In other words, the coverage should be effectively complete.

In Figure 2 there is also shown a branch chain ester group at 10. It will be noted that the branch chain gives the group a somewhat larger effective area of protection for the particles. It will be understood that the coating 9 extends all about the silica particles in three dimensions and is illustrated in Figure 2 by only a few groups. The branch chain group at 10 can occupy part of the surface if a mixture of alcohols are used for esterification of the surface.

Now referring again to Figure 1, it will be observed of the particles at 1, 2 and 3 that the silica cores 4 cannot come into contact with one another. They are so kept from contact by the hydrophobic coating 9. When a pile is put into an organic solvent, the particles disperse completely to form a sol consisting of particles in the colloidal size range and having the particles in the same state of division as in the original reversible, organosol from which they were derived. The sols are very stable for there is no opportunity for the silica cores to come into contact and to form aggregates which cannot easily come apart.

It is to be observed that in Figure 1 there is shown particles 5, 6, 7 and 11 which should be avoided in products of the invention. These particles illustrate what will happen if in a reversible, organosol of the invention there is present, as by the addition thereto, some silica particles which are only partly covered with a hydrophobic material. The particles thus are illustrated as partly covered with spots of a hydrophobic material 8.

The silica particles 5, 6, 7, and 11 are illustrated as joined together at points of contact of their uncoated surfaces. The silica particles thus bound together are held through siloxane bonds or bridges. These siloxane bonds may be formed prior to coating of the silica particles if the particles have joined together before the coating is applied, as when a sol becomes partially gelled before the coating has been completed. Again, the silica particles 5, 6 and 7 may be discrete in a sol, but receive only a partial coating. Upon drying, the particles will form siloxane bonds and they cannot be redispersed by the addition of organic solvents.

From the drawings, it will be evident that reversible, organosols of the invention which dry to form the properly coated particles of Figure 1 and which are readily redispersible in organic solvents must be substantially free from partially-coated silica particles. In other words the particles should be non-siloxane-bonding, so that when the sol is dry the particles will not bond to form an irreversible gel.

In the preparation of products of the invention a substantially anhydrous silica alcosol is heated, preferably to a temperature of at least about 100° C. to effect surface-esterification. Under practical conditions it is ordinarily preferred to heat at temperatures of at least 190° C. and considerably high temperatures will often be employed.

THE STARTING ALCOSOL

The simplest starting point in preparing a product of the invention is an alcosol of silica. Generally, it may be said that any silica sol may be used, the term sol being used to distinguish from ionic solutions. In other words, the products of the invention are particles of silica which are surface-coated with a hydrophobing material by chemical reaction in contradistinction to physically homogeneous chemical compounds of low molecular weight silica with organic molecules. It will be understood that silica solutions of very low molecular weight, more commonly called polysilicic acid, do not provide discrete particles of silica such as those shown or used in the present invention.

More specifically, it may be noted that the silica particles of a sol for use according to the present invention should have a size greater than about 5 millimicrons. The particle size may range upwardly to the upper limit of colloidal size and in general the size may go up to as large as about 150 millimicrons. More specifically, it is preferred to use a sol having particles which have an average size between 10 and 60 millimicrons.

In the broadest aspects of the invention, sols which have been prepared by the redispersion of silica gels may be used. There may be employed, for example, such alcohols as those described in White United States Patent 2,375,738. Alternatively, there may be used alcosols prepared as in Marshall United States Patent 2,285,449.

While the above and other known sols can be used, by far the best results, according to the present invention, are obtained by using sols which are composed of dense, spherical particles of amorphous silica which are substantially non-aggregated and which are relatively uniform in size. In such preferred sols the particles are either separate and discrete or, where there is aggregation or bonding, only two or three particles ordinarily will be found together. Such sols do not interlock and form irreversible gels when converted to products of the invention.

Sols of small particle size, useful according to the invention, may be prepared as described in Bird United States Patent 2,244,325. Sols thus prepared by passing an alkali metal silicate through an ion exchange resin can be concentrated by heating to give whatever silicate content is desired. Sols made by ion exchange will have very small particle size. Ordinarily they should be heated for a period to cause growth of the particles before use of the sols in processes of the invention. Such heating should be conducted in the presence of small amounts of alkali to stabilize the sol and to prevent aggregation.

Since the particles in sols which are most suitable for use according to the invention are in the size range above about 10 millimicrons, it is most preferred to prepare sols as described in the Bechtold and Snyder United States Patent 2,574,902. Such sols are composed of dense, amorphous silica particles, the density being determined as described in the patent. The lack of aggregation of the particles, that is to say, their discrete character, is shown by the relative viscosity of the sols.

The sols of the preferred character, such as those shown in the Bechtold and Snyder patent, may be prepared or improved by still other processes. For example, there is considerable advantage in using sols which are comparatively free from impurities. Such sols are described in Rule United States Patents 2,577,484 and 2,577,485. No extended discussion of these preferred types of sols appears necessary because their preparation is fully described in the Bechtold et al. and Rule patents, together with methods for their characterization.

The concentration of the alcosol is comparatively unimportant, so long as it is comparatively stable considering the nature of the particular sol employed. It is preferred to start with a sol which is as concentrated as possible, since the first step is to remove water and as little water should be present as possible. The Rule and the Bechtold et al. sols are especially advantageous because they can be prepared at high concentrations.

Before adding alcohol to the sols the sodium content should be low, and if not already low, it should be lowered as by removing sodium. This can be done, for example, by the use of an ion exchanger. The pH of the sol should preferably be fairly low and preferably be around pH 3.

THE ORGANOSOLS AND THEIR DEHYDRATION

The silica sol is mixed with a water-miscible organic liquid and water is removed. If the water-miscible liquid is higher boiling than the water, the water can simply be removed by distillation. If the water-miscible liquid is lower boiling than water, the water can be removed as by azeotropic distillation. Third components can be added if desired to aid the distillation. The distillation can be effected under vacuum if desired, and this is preferred in many cases.

The system is comparatively unstable during the water-removal step. It is desirable to make this operation as short in time as possible and to remove water at as low a temperature as possible. If too long a time is used, the sol will tend to gel or to form precipitates or aggregates.

The water-miscible liquid may be methyl ethyl ketone, triethylphosphate, methyl "Cellosolve" acetate, or acetone.

During the dehydration, it is preferred to have an alcohol present though it could be added towards or at the end of the dehydration. It is most preferred to use an alcohol as the water-miscible liquid. There may be used, for example, ethanol, normal propanol, tertiary butyl alcohol, isopropanol, ethyl "Cellosolve," methyl "Carbitol," and ethyl "Carbitol."

Dehydration should be carried to the point where water is substantially all removed. The water content should be reduced, for instance, until it is no greater than about 1%, while maintaining the temperature low. After the water content has fallen below about 1% the temperature may be raised gradually and esterification may proceed if the coating is to be an ester coating.

It will be observed that the White Patent 2,375,738 describes methods for the preparation of aqueous alcosols, which can be used as a starting material for the present invention. It will be understood, however, that the methods described for preparing the alcosols are preferably applied rather to sols such as those of Bechtold et al. and Rule, and furthermore, that the precautions above described should be observed to avoid aggregation of the particles.

The proportion of water can be effectively diminished by the use of correspondingly large amounts of alcohol. This offers the advantage that it makes the sol being handled more dilute and therefore minimizes aggregation. The sol should not, however, be so dilute as to require the handling of excessive quantities of liquid.

The coating applied to the silica particles should, as has been previously described in connection with the drawings, effectively cover the entire surface of the silica particles. By effecting a substantially complete covering or coating, the particles are made non-siloxane-bonding.

The coating material may be any organic substance which chemically reacts with the silica surface of the particles and enough must be used to give effective covering of the surfaces described. The coating may, for example, be a monomolecular layer of trimethylsilyl groups attached to the surface through an oxygen atom.

By far the preferred coating agents for silica particles to prepare reversible organosols, according to the present invention, are alcohols. The alcohols react with the silica surface to form surface ester groups. This is illustrated in Figure 2 at 9 where a primary alcohol is illustrated as attached to the silica surface through oxygen.

In the processes of this invention, the esterifying agents used are primary and secondary alcohols. Thus, the alcohols can be defined as having the formula ROH, wherein R is a hydrocarbon radical in which the carbon atom attached to oxygen is also attached to at least one hydrogen.

Further examples of monohydric alcohols are normal straight chain alcohols such as ethyl, n-propyl, n-butyl, n-pentyl (amyl), n-hexyl, n-heptyl, n-octyl, n-nonyl, n-decyl, n-undecyl, n-dodecyl (lauryl), n-tetradecyl (myristyl), n-hexadecyl (cetyl) and n-octadecyl (stearyl); branched chain primary alcohols such as isobutyl (2-methyl-1-propanol), isoamyl (3-methyl-1-butanol), 2,2,4, trimethyl hexane-1-ol, and 5,7,7, trimethyl, 2(1,3,3 trimethyl butyl) octane-1-ol; secondary alcohols such as isopropyl sec-butyl (2-butanol), sec-amyl (2-pentanol), sec-n-octyl (methyl hexyl carbinol or 2-octanol), methyl isobutyl carbinol, and di-iso-propyl carbinol (2,4 dimethyl pentane-3-ol). Examples of alicyclic alcohols of this class are cyclopentanol, cyclohexanol, cycloheptanol (suberol) and menthol. Examples of alcohols of this class having ethylenic unsaturation are allyl (2-propene-1-ol), crotyl (2-butene-1-ol), oleyl (cis-9-octadecen-1-ol), citronellol (3,7-di-methyl-6(or 7)-octen-1-ol), and geraniol (3,7-dimethyl-2,6-octadien-1-ol). Acetylenic unsaturation is illustrated by propargyl alcohol (2-propyn-1-ol). Aromatic alcohols (araliphatic) are illustrated by benzyl (phenyl carbinol), betaphenyl-ethyl (2-phenyl-ethanol), hydrocinnamyl (3-phenyl-1-propanol), alpha-methylbenzyl (1-phenyl-ethanol), and cinnamyl (3-phenyl-2-propene-1-ol).

The saturated primary and secondary alcohols are preferred. In this case the resulting ester groups are alkoxy groups.

The saturated primary alcohols are particularly preferred esterifying agents because they react more readily and at lower temperatures than do secondary or tertiary alcohols and are more stable than tertiary alcohols or unsaturated alcohols at the temperatures of the reaction. The unsaturated alcohols, particularly those containing one or more triple bonds or multiple double bonds are quite often unstable. Consequently, those unsaturated alcohols which are known to polymerize, crack, or otherwise decompose under the conditions of temperature, pressure, etc., required to carry out the esterification of the silica (as given hereinafter) can obviously not be employed in carrying out this invention. However, there are a considerable number of unsaturated alcohols which are not particularly unstable under the conditions necessary for the esterification of silica, and these may be used in carrying out this reaction as is shown in the examples. Under certain conditions, as for example in the case of allyl alcohol, a small amount of polymerization may occur during the esterification process. If desired, such polymeric by-product materials may be removed by extraction methods, but this is not necessary for many uses. As a result of the instability of the unsaturated alcohols and possible formation of by-products resulting from their use, they are difficult to use and hence are not preferred for many purposes. However, for certain uses, such as incorporation of the esterified silica as a reinforcing filler in certain organic polymers, the silicas esterified with unsaturated alcohols may be highly preferred, since subsequent treatment may result in copolymerization of the unsaturated -OR groups on silica with active unsaturated linkages in the partially polymerized organic polymer.

Technically, there is no upper limit to the number of carbon atoms which may be present in the esterifying agent. As a practical matter, the group of alcohols having 2 to 18 carbon atoms include the majority of known monohydric alcohols and offer a selection of organic molecule sizes which should be adequate for any purpose. The alcohols having from 3 to 6 carbon atoms are also especially preferred because they are relatively low boiling liquids which are most readily handled in the process, and when present as unreacted excess can be most readily removed from the esterified product by drying in a vacuum oven without the necessity of extraction procedures. They are also the most economical to use, and yield a product having a low ratio of organic matter to silica which is very desirable for certain uses.

Tertiary alcohols are much less reactive than the primary and secondary alcohols, and they are also lacking in stability at the higher temperatures. At higher temperatures where reaction might be expected the alcohol decomposes and thus yields only very incomplete esterification at 200° C. in an autoclave.

While methyl alcohol will react with the siliceous material to form a surface of methoxy groups, the resulting product is not stable to hydrolysis. Furthermore, the product is not very highly hydrophobic even when the surface is crowded with methoxy groups.

The esterifying agent need not be a single alcohol. Mixtures of alcohols can be used. For example, a mixture of isobutyl and sec-butyl alcohol can be used. Also, there can be used a mixture of different chain lengths such as is found in technical grades of lauryl alcohol made from cocoanut oil ("Lorol"), in technical oleyl alcohol made from lard, and in technical stearyl alcohol made from tallow.

The ratio of alcohol to silica is limited only by the fact that sufficient alcohol must be present to provide an adequate excess over that consumed in the reaction and to provide a sufficient volume of liquid medium to minimize aggregation prior to the time when esterification is substantially complete. It will be noted that the alcohol should be present in the liquid state, that is, it should not be gaseous, at the temperatures and pressures used.

It will be understood that during the esterification reaction there is some water formed. It is desirable to remove this water as it is formed, preferably by distillation, either direct or azeotropic, depending upon the particular system. Again it will be noted that if the volume of alcohol is large relative to the amount of silica the percentage of water will not be as great. In any event the removal of water must be continued in order to maintain a water content below 1% and preferably as low as one-tenth of 1% or less, as the system is heated to bring about completion of the esterification reaction.

In addition to maintaining the water content of the system at a low volume it is important that the silica be heated with the alcohol at an elevated temperature. There is a definite time-temperature relationship to this reaction. At any given temperature the reaction proceeds quite rapidly up to a certain point, which is characteristic of the temperature and of the alcohol and thereafter, proceeds more slowly. The minimum reaction time and temperature in order to obtain complete esterification varies with the type of alcohol used. Short-chain primary alcohols react somewhat more rapidly than long-chain alcohols, and in general primary alcohols react more rapidly and more completely at any given temperature than secondary alcohols. It appears that the rate of reaction and the extent of reaction is related in some way to the shape of the alcohol molecule employed. The longer alcohols and the more highly branched alcohols, and particularly the secondary alcohols, which essentially represent a branching at the hydroxy group as shown at 10 in Figure 2, represent varying amounts of esteric hindrance. For essentially complete reaction of the surface a temperature of 190° C. is employed. The reaction is essentially completed after about one hour at this temperature with primary alcohols. Secondary alcohols require a considerably longer time and it is preferred with secondary alcohols to operate at a temperature of the order of 275° C.

There is a maximum temperature at which the reaction of alcohol and silica can be carried out due to the fact that if the temperature is too high thermal decomposition of the alcohol will occur. The temperature should not exceed the thermal decomposition of the alcohol while in the presence of the silica, nor should it exceed the point of thermal stability of the esterified product. Secondary alcohols are more unstable than primary, some of them being decomposed at temperatures above about 300° C. Because of the general instability of alcohols at high temperature, it is preferred not to prolong the heating of the reaction mixture any more than is necessary to achieve a completion of the esterification reaction.

In a preferred aspect of the invention the proportion of silica to ester groups in the esterified particles is at least 1:1 by weight. This means that when the solvent or suspending medium of the sol is removed, as by evaporating the sol to dryness, the product obtained will preferably contain at least about 50% by weight of $SiO_2$. If the particles are less than half silica they take on the characteristics of the organic components on their surfaces, rather than of the interior siliceous cores. It will be remembered that the principal purpose of the ester groups is to protect the surface of the silica particles.

The number of ester groups required to protect the surface and to give effectively complete coverage can be estimated for alcohols by a formula which will now be described. This formula gives the approximate relationship between the characteristic bushiness of an ester group and its effective surface protection, and is derived from the molecular structure. The term $n$ (branch number) is defined as the maximum number of equivalent branches in the ester groups, and is determined by counting the maximum number of carbon atoms which are separated from the oxygen atom by an equal number of carbon atoms. This corresponds to the width of the hydrocarbon group at its thickest point, if spread out flat. Thus, for example, in normal butanol the butyl group, being a single straight chain, is only one carbon atom wide at its thickest point. On the other hand, in 2,2,4-trimethyl hexanol, the molecule is 3 carbon atoms wide at its widest position. As an extreme case of branching, the following molecule is 5 carbon atoms wide at its broadest point, as counted above: 5,7,7-trimethyl, 2(1,3,3 trimethyl butyl) octane-1-ol. The number of ester groups required completely to protect the surface can be estimated for alcohols having $n$ greater than 2 on the basis that an alcohol with a branch number $n$ will cover $0.14n$ square millimicrons. Thus, for the above branched alcohol having $n=5$, one ester group protects 0.70 square millimicron, and therefore $$\frac{100}{.70} = 143$$

ester groups are required for every 100 square millimicrons. Experimental data bears out this theory. The protecting power of other alcohols of known structure may likewise be estimated approximately by one skilled in the art.

The non-siloxane-bonding silica particles of the invention can most easily be examined to determine whether they are effectively coated by determination of their dye area as described below. This may also be termed their specific hydroxylated surface area. The dye area of preferred products of the invention is less than ten square meters per gram and is preferably zero.

The specific hydroxylated surface area, or dye area, of products of the invention may be calculated by removing the organic solvent, preferably by heating under a high vacuum at about 150° C. (The dye area may be determined by the method for determining surface areas which has been published by I. Shapiro and I. M. Kolthoff in the "Journal of the American Chemical Society," volume 72, page 776, (1950)).

The test is carried out by agitating a suspension of a few tenths of a gram of a dried silica product of the invention in an anhydrous benzene solution of methyl red. The acid form of methyl red, p-dimethylaminoazobenzene-o-carboxylic acid, $(CH_3)_2C_6H_4NNC_6H_4COOH$, is used. Equilibrium adsorption is reached in about two hours, and an equilibrium concentration of 400 milligrams of dye per liter insures saturation adsorption. The methyl red adsorption capacity is calculated from the observed decrease in dye concentration, in relation to the weight of the sample as follows:

Methyl red adsorption capacity =

$$\frac{\text{Grams of dye adsorbed}}{\text{Grams of silica employed}}$$

Adsorption spectrophotometric observations at 4750 A. are most convenient for the analyses of both the original and the equilibrium benzene solutions of methyl red. In the work described in this case a Beckman Model DU Series 2561 spectrophotometer was used. The specific hydroxylated surface area in square meters per gram is calculated according to the following equation, utilizing the covering power of each adsorbed methyl red molecule which is approximately 1.16 square millimicrons, as determined by correlation with nitrogen adsorption measurements:

Specific hydroxylated surface area in m.²/g. =

$$\frac{(\text{Methyl red adsorption capacity})}{(\text{Molecular weight of methyl red})} \times 116 \times 10^{-20}$$

When the silica is completely esterified the methyl red dye will not adsorb on the esterified portions of the surface, i. e., the portions of the surface covered by ester groups chemically reacted therewith. Consequently, measurement of the adsorption of methyl red dye before and after esterification shows a decrease which is proportional to the decrease in exposed specific hydroxylated surface area.

For samples which adsorb very little dye, as is the case in the preferred products of the invention, a specific hydroxylated surface area less than 5 square meters per gram is considered to be essentially zero. In some preferred products of the invention the specific hydroxylated surface area is less than 10m.²/g.

It will be noted that the method described above is applicable to products of the invention which do not disperse directly in benzene. If the products do thus redisperse, they may be removed from the benzene by ultracentrifuging. This is particularly applicable to particles of comparatively large size, such as those larger than, say, about 25 millimicrons.

If the products cannot be separated from benzene, then a chemical analysis for carbon will permit calculation of the degree of esterification, when such information is combined with the specific surface area of the particular silica used and, of course, providing the composition of the alcohol is known. If the alcohol is not known, then identification is possible by removing by hydrolysis some of the coating from the product and determining its composition.

The specific surface area of the silica in the product $S_n$ is determined by oxidizing off the organic coating from the dried product and determining the specific surface area of the silica by nitrogen adsorption. The accepted method for measuring specific surface area by nitrogen adsorption is given in an article, "A new method for measuring the surface areas of finely divided materials and for determining the size of particles" by P. H. Emmett in the publication, Symposium on New Methods for Particle Size Determination in the Sub-Sieve Range, published by the American Society for Testing Materials, March 4, 1941, p. 95. The value of 0.162 square millimicron for the area covered by one surface adsorbed nitrogen molecule is used in calculating the specific surface areas. Areas are reported in square meters per gram, m.²/g.

The removal of the organic coating must be done carefully in order to avoid sintering of the silica and changing its specific surface area. The removal of the organic coating may be accomplished by decomposing the esterified product by slowly heating it in a stream of oxygen up to 500° C. and holding it there for about three hours. The product is then cooled and its specific surface area determined by nitrogen adsorption.

When reference is made herein to silica sols it is meant that the sol particles present silica surfaces before being surface-coated. It is of no importance what the interior of the silica particle is composed of. It may be any material whatsoever so long as the particle has a surface of dense silica which is reactive with the coating material herein described. The silica surface should, of course, be continuous and amorphous.

The sols of the invention may be alcosols, that is sols that contain some alcohol, with or without other added organic material. Alternatively, once the ester coating has been applied the alcohol may be completely removed and the product may be dissolved in many other types of organic solvents. The best solvents for a particular product will depend upon the nature of the particular coating used.

The organosols may contain any amount of the coated particles. Thus, very concentrated dispersions, containing up to 70% or even more of $SiO_2$, may be obtained, particularly in those instances where the particles are very uniform in shape and size and are in the preferred size range. It will be evident, also, that even larger amounts of silica may be present, but as the quantity of organic solvent becomes less the product is merely wetted with the solvent and can scarcely be called a dispersion. There is, however, advantage in products which are more nearly paste dispersions than true sol-like dispersions. Instead of dispersing the products in organic solvents of the usual type which are liquid at ordinary temperatures they may be dispersed in high-melting organic compounds, such as waxes, like carnauba, or in thermal plastic polymers, such as polyethylene or polyvinylidinechloride. Again, the materials may be dispersed in one of the components to be copolymerized to make a polymer or in a monomer such as styrene or vinyl acetate or methylmethacrylate, and thus will be present in the product as it is finally produced.

Products may also be dispersed readily in elastomers and have special advantages over known types of fillers in natural rubber, neoprene, GR–S, and especially in silicone rubbers.

The compositions will be found particularly useful in coating compositions which contain organic components. Thus, they may be used in paints and varnishes and in adhesives which have organic components, such as nitrocellulose-types. Especially advantageous are the uses in coating compositions containing waxes, such as those in which a wax like carnauba, usually with an organic solvent, is employed. Such waxes contain numerous additives.

Depending upon the particular alcohol used, excellent compatability with particular systems can be achieved. Thus, with long branch chain alcohols the products are soluble in long chain hydrocarbons, such as kerosene. On the other hand, surface esterification with an aromatic substituted alcohol, such as benzyl alcohol, gives products soluble in an aromatic hydrocarbon such as benzene. Again, if the products are to be used in particular plastic compositions or in particular paints, groups can be substituted on the alcohol corresponding to groups which are found in the particular organic system.

In order that the invention may be better understood, the following specific illustrative examples are given in addition to those generally described above:

*Example 1*

The following is a preferred method of preparing a product of this invention. The first step is to prepare an alcosol which is anhydrous, and in which the silica particles are not gelled or aggregated. If one simply mixes an electrolyte-free aquasol of colloidal silica and a water-miscible alcohol such as propanol, and then attempts to remove the water by distillation, some aggregation may occur, since the joining together of colloidal silica particles upon collision in solution is facilitated by the presence of water. This is avoided by starting with a certain amount of alcohol in a still-pot and then adding colloidal silica to this alcohol, while stirring vigorously in order to disperse the aquasol in the alcohol as rapidly as it is added, while at the same time distilling out the water about as fast as it is added to the system, so that the alcohol remains fairly anhydrous, i.e., below 15% by wt. of water. By this procedure, by continued addition of aquasol to the body of alcohol, a fairly concentrated alcosol can be obtained without appreciable aggregation of the silica particles during the removal of the water.

The starting material was an aqueous solution of colloidal silica, the particles of which were about 17 millimicrons in diameter, the sol containing 30% $SiO_2$ by weight, stabilized with alkali, 1 part by weight of $Na_2O$ per 100 parts of $SiO_2$. This sol was prepared in accordance with the process of U. S. Patent 2,574,902, to Bechtold and Snyder. In order to improve the compatibility of this sol with alcohol for the purposes of the process of this invention, the sodium ions were removed by treating the sol with the hydrogen form of an ion exchanger. The pH of this sodium-free sol was about 3.5.

The colloidal silica in this aquasol was then transferred to propanol, giving an alcosol, as follows: There was charged into a still, 6 kilograms of normal propyl alcohol. This still was fitted with a fractionating column and reflux condenser, and a device for controlling the reflux ratio. Separately, 3.2 kilograms of the sodium-free deionized collodial silica was diluted with 8.0 kilograms of normal propyl alcohol. The normal propyl alcohol in the still was heated to reflux and the propanol-diluted sol of colloidal silica was added to the alcohol in the still, under conditions of thorough agitation. The addition was carried out sufficiently slowly that the water was continuously removed as the azeotrope with normal propyl alcohol, which boils at about 88° C., and the water content of the liquid in the pot was kept relatively low, i.e., less than 15%, and most of the time less than about 10% by weight, by distilling water from the still as rapidly as it was being added in the form of the aqueous alcosol. When all of the aqueous alcosol of colloidal silica had been added to the distillation pot, the distillation was continued until the water content in the sol was reduced to below 0.5%, thus producing an essentially anyhdrous silica alcosol in the still. Analysis showed that the anhydrous alcosol prepared in this manner contained 19.9% solids, which was practically all colloidal silica, and the water content was 0.53%.

Four hundred milliliters of this anhydrous alcosol were mixed with 300 milliliters of a branched chain octadecyl alcohol having the formula

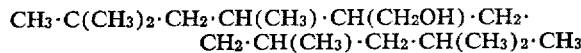

$CH_3 \cdot C(CH_3)_2 \cdot CH_2 \cdot CH(CH_3) \cdot CH(CH_2OH) \cdot CH_2 \cdot CH_2 \cdot CH(CH_3) \cdot CH_2 \cdot CH(CH_3)_2 \cdot CH_3$ Propanol was then distilled from the mixture at atmospheric pressure, leaving the colloidal silica as a relatively clear, slightly viscous solution in the octadecyl alcohol. This colloidal solution was then heated to elevated temperature to bring about an exchange of octadecyl groups for propyl groups. Thus, distillation of the mixture was continued at atmospheric pressure until the temperature in the distillation flask was 140° C. Nitrogen was then blown through the flask and the temperature was further raised to 200° C. for 3 hours. The pressure in the distilling equipment was then reduced to between 12 and 15 millimeters, and the free octadecyl alcohol was removed, the boiling point at this pressure being about 170° C. The powdery residue in the flask was then further dried in a vacuum oven at 10 millimeters pressure and at a temperature of 180° C. for a period of 2 days. The dry powdery product thus obtained was readily soluble in kerosene, to give a clear colloidal solution. This shows that the colloidal solution of the octadecyl-esterified silica particles in the octadecyl alcohol was a reversible colloidal solution. The colloidal solution obtained by dissolving the product in kerosene could be dried to a powder and this could be redissolved in kerosene. A colloidal solution of this product in kerosene containing 20% by weight of $SiO_2$ appears to be permanently stable toward gelling. Electron micrographs show that the silica particles in the kerosene sol are of the same size as in the original aquasol. However, they are no longer hydrophilic, and when the kerosene is evaporated, the surface esterified silica powder is highly hydrophobic.

Further data on the dried, powdered, kerosene-soluble product are as follows:

Specific surface area of silica particles: 168 square meters per gram.

Analysis of powder:
Carbon _____ percent___ 8.29
$SiO_2$ _____ do____ 87.0

Degree of esterification: 1.58 $C_{18}$ alkoxy groups per square millimicron.

Solubility: Readily dispersible to give a practically clear colloidal solution in kerosene, containing 20% solids.

Specific hydroxylated surface area: Less than 5m.$^2$/g.

*Example 2*

This exemplifies the preparation of a silica powder, of which the individual particles are kept from coalescing by esterification of the surface of the particles with propyl alcohol.

An anhydrous alcosol of colloidal silica in normal propanol was first prepared as follows: Six kilograms of normal propanol were first mixed with two kilograms of electrolyte-free aqueous solution of colloidal silica having a particle size of about 17 millimicrons, the sol containing 30% by weight of $SiO_2$. Separately, into a distilling apparatus, there was placed 6 kilograms of normal propanol. This distilling apparatus consisted of a distillation pot, into which the 6 kilograms of normal propanol were placed, a steam jacket around the distillation pot, fitted with a reflux condenser with a device to permit control of the reflux ratio. The mixture of propanol and colloidal silica was added to the distillation pot over a period of 8½ hours, the rate of addition being approximately 500 milliliters every 15 minutes during the first 3 hours, the remainder being added thereafter. At the end of the period, the whole of the propanol-colloidal silica mixture had been added to the distillation pot. At the same time, water and alcohol was removed from the pot at such a rate as to maintain approximately a constant volume of liquid in the pot. During this time the reflux ratio was maintained for the most part at about 1:1 and the temperature at the head of the distillation column ranged from 88.5 to about 90, remaining for the most part at about 86 to 87° C. During this period, 6.3 volumes of distillate were recovered from the distillation pot. Analysis of a sample of this sol showed that it had a solids content of 10.1% by weight, a water content of 0.48%, and that the solids, a hydrophilic granular material, contained 95.35% SiO₂, and 0.87% carbon. The specific surface area of the colloidal particles of silica was 175 square meters per gram, whence it is calculated that the surface of the colloidal particles contained only 0.87 propyl group per square millimicron. The powder obtained by drying the sol at this stage was insoluble and not dispersible in organic solvents.

Five hundred milliliters of this propanol sol was heated in a two-liter autoclave to a temperature of 300° C., and then cooled as rapidly as possible by blowing cold air over the autoclave. Upon evaporating the alcohol from a sample of this esterified, reversible sol, analysis showed that the residue obtained by drying at 110° C. contained 93.26% SiO₂, 3.63% carbon, 0.86% hydrogen. Since the specific surface area of the silica particles was still 175 m.²/g., the surface was therefore covered with 3.7 propoxy groups per square millimicron. That the coverage was actually complete was demonstrated by the fact that the powder was very highly hydrophobic and the specific hydroxylated surface area was less than 5 m.²/g. A sample of the product sol was evaporated to dryness at 100° C., and stored in a tightly stoppered bottle. When 2.061 grams of the powder were mixed with 14.2 grams of normal butyl alcohol it dissolved readily to give a colloidal solution containing 12.7% solids. This solution of propyl-esterified colloidal particles of silica in butyl alcohol was quite clear, showing that dispersion to the colloidal state was readily achieved.

*Example 3*

The following example shows the preparation of a dry silica powder consisting of colloidal particles of silica, surface-esterified with benzyl alcohol, which is soluble to give a clear, colloidal dispersion in benzene.

A portion of the anhydrous propanol sol of Example 1, containing 19.9% solids, was transferred to benzyl alcohol by mixing it with benzyl alcohol, distilling out the propanol at atmospheric pressure, and finally heating the resulting colloidal solution in benzyl alcohol to effect complete esterification of the surface of the colloidal particles with benzyl alcohol. Thus, to 500 cc. of benzyl alcohol in a still fitted with fractionating column, 500 cc. of the 19% propanol sol were added as the propanol was continuously distilled out at atmospheric pressure. The temperature of the material in the distillation pot was about 125° C. during most of the distillation, until the propanol had been removed. The mixture was then boiled at the boiling point of benzyl alcohol, which was about 190° C., for about 2 hours, and then the free benzyl alcohol was removed under vacuum at 100° C.

The resulting dry powder was found to be readily soluble in benzene, giving a clear colloidal solution. The powder was not soluble in kerosene. In benzene, a clear, stable sol containing 44.6% solids was readily produced. Small portions of this sol could be evaporated slowly to the point where it became viscous, at which point the SiO₂ content was between 65 and 70%. Upon evaporation of the benzene solution, containing 44.6% solids, to remove all of the benzene, chemical analysis showed that the dry powder which could be redissolved in benzene, was characterized as follows:

Specific surface area of silica particles: 168 square meters per gram.
Analysis of solids dried under vacuum:
  SiO₂ _____ percent __ 88.8
  Carbon _____ do ____ 7.68
Benzoxy groups per square millimicron: 3.65.
Specific hydroxylated surface area: Less than 5 m.²/g.

*Example 4*

This example illustrates a process and product of the invention wherein the coating of the silica particles is effected by treating them with an alkyl halosilane.

A colloidal silica aquasol (prepared according to a process of the Bechtold and Snyder patent and containing about 30% SiO₂ by weight) was deionized by passing it through a bed of "Nalco IR3" anionic exchange resin and then through a bed of "H. C. R." cationic exchange resin in its hydrogen form. The resulting pH of the sol was 2.30. A sample of 584 gms. of this sol (containing 175 g. SiO₂) was mixed with 2000 grams of triethyl phosphate, and the water was evaporated under reduced pressure through a 12" Vigreaux column. The resulting essentially anhydrous solution containing about 20% SiO₂ in triethyl phosphate was only slightly turbid. Two hundred grams of the sol (containing 40 g. SiO₂) were mixed with 75 cc. of anhydrous ether and refluxed at 50° C., while a solution of 8.6 g. of dimethyl silicon dichloride in 100 cc. of ether was added over a period of ½ hour. HCl vapors were observed at the top of the condenser. Ether and excess dimethyl silicon dichloride were then distilled from the solution through a 12" Vigreaux column. The resulting stable sol was concentrated further by distilling off triethyl phosphate under vacuum, eventually leaving a thick gummy residue containing about 63% SiO₂. The product was colloidally dispersible by benzene and chloroform.

*Example 5*

This example illustrates another alkyl halosilane coating of the silica particles to give a reversible organosol.

Two hundred grams of the triethyl phosphate sol containing 20% SiO₂ prepared as in Example 4 was mixed with 50 cc. of anhydrous ether and a solution of 16.5 grams of trimethyl silicon chloride in 30.5 cc. of ether was added. The resulting sol was refluxed at 52–53° C. for 1 hour. Ether and excess trimethyl silicon chloride were then distilled from the mixture. A viscous, soupy sol resulted, which in a test portion gave a flocculent, white precipitate upon addition of water unlike the unmodified triethyl phosphate sol which was miscible with water. The thick triethyl phosphate sol containing the hydrophobed silica particles was concentrated further by distilling off triethyl phosphate under vacuum. The clear, gummy residue was easily soluble in ether and chloroform giving clear, stable sols.

I claim:

1. A silica organosol, the silica particles of which, after being dried out of the sol, are redispersible in the organic liquid comprising the liquid phase of the organosol, said particles having an average diameter of 5 to 150 millimicrons, being dense, and having a chemically bound, organic, hydrophobic surface coating, the extent of the coating being sufficient to make the specific hydroxylated surface area of the particles less than about 10 m.²/g.

2. A silica organosol, the silica particles of which, after being dried out of the sol, are redispersible in the organic liquid comprising the liquid phase of the organosol, said particles having an average diameter of 5 to 150 millimicrons, being dense, and being surface-esterified with a monohydric, unsubstituted alcohol wherein the carbon atom attached to the alcohol oxygen is also attached to at least one hydrogen and the alcohol molecule contains from 2 to 18 carbon atoms, the extent of surface-esterification being sufficient to make the specific hydroxylated surface area of the particles less than about 10 m.²/g.

3. An organo-dispersible powder of dense silica particles having an average size of 5 to 150 millimicrons, the particles having a chemically bound, hydrophobic coating of organosilyl groups, the extent of the coating being sufficient to make the specific hydroxylated surface area of the particles less than about 10 m.²/g.

4. A silica organosol, the silica particles of which, after being dried out of the sol, are redispersible in the organic liquid phase of the organosol, said particles having an average size of from 10 to 60 millimicrons, and the particles being surface-esterified with a monohydric, unsubstituted alcohol wherein the carbon atom attached to the alcohol oxygen is also attached to at least one hydrogen and the alcohol molecule contains from 2 to 18 carbon atoms, the extent of surface esterification being sufficient to make the specific hydroxylated surface area of the particles less than about 10 m.²/g.

5. An organo-dispersible powder of hydrophobic, dense, surface-esterified silica particles having an average size of 5 to 150 millimicrons, the particles being surface-esterified with a monohydric, unsubstituted alcohol wherein the carbon atom attached to the alcohol oxygen is also attached to at least one hydrogen and the alcohol molecule contains from 2 to 18 carbon atoms, and the extent of surface esterification being sufficient to make the specific hydroxylated surface area of the particles less than about 10 m.²/g.

6. An organo-dispersible powder of hydrophobic, dense, surface-esterified silica particles, said particles having an average size of from 10 to 60 millimicrons and being surface-esterified with a monohydric, unsubstituted alcohol wherein the carbon atom attached to the alcohol oxygen is also attached to at least one hydrogen and the alcohol molecule contains from 2 to 18 carbon atoms, the extent of surface esterification being sufficient to make the specific hydroxylated surface area of the particles less than about 10 m.²/g.

References Cited in the file of this patent

UNITED STATES PATENTS

| | | |
|---|---|---|
| 2,383,653 | Kirk | Aug. 28, 1945 |
| 2,386,247 | Marshall | Oct. 9, 1945 |
| 2,395,880 | Kirk | Mar. 5, 1946 |
| 2,408,656 | Kirk | Oct. 1, 1946 |
| 2,433,776 | Marshall | Dec. 30, 1947 |
| 2,433,777 | Marshall | Dec. 30, 1947 |
| 2,433,778 | Marshall | Dec. 30, 1947 |
| 2,433,779 | Marshall | Dec. 30, 1947 |
| 2,433,780 | Marshall | Dec. 30, 1947 |
| 2,457,971 | Voorhees | Jan. 4, 1949 |
| 2,657,149 | Iler | Oct. 27, 1953 |
| 2,680,696 | Broge | June 8, 1954 |

OTHER REFERENCES

Hackh's Chemical Dictionary, Blakiston, Philadelphia, 1944, ed. 3, page 537.

UNITED STATES PATENT OFFICE

CERTIFICATE OF CORRECTION

Patent No. 2,801,185                                                    July 30, 1957

Ralph K. Iler

It is hereby certified that error appears in the printed specification of the above numbered patent requiring correction and that the said Letters Patent should read as corrected below.

Column 1, lines 31 and 32, for "enlarge" read --enlarged--; column 2, line 58, for "alcohols" read --alcosols--; column 3, line 51, for "vocuum" read --vacuum--; column 4, line 1, strike out "aqueous"; line 33, before "alcohols" insert --monohydric--.

Signed and sealed this 1st day of October 1957.

(SEAL)
Attest:
KARL H. AXLINE

Attesting Officer

ROBERT C. WATSON
                                                                                        Commissioner of Patents